US007302095B2

(12) United States Patent
Steinberg

(10) Patent No.: US 7,302,095 B2
(45) Date of Patent: Nov. 27, 2007

(54) METHOD AND APPARATUS FOR AUTOMATED IMAGE CORRECTION FOR DIGITAL IMAGE ACQUISITION

(75) Inventor: John Steinberg, Millbrae, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 56 days.

(21) Appl. No.: 11/224,486

(22) Filed: Sep. 12, 2005

(65) Prior Publication Data

US 2006/0008142 A1  Jan. 12, 2006

Related U.S. Application Data

(63) Continuation of application No. 09/826,336, filed on Apr. 3, 2001, now Pat. No. 6,956,966.

(51) Int. Cl.
*G06K 9/00* (2006.01)
(52) U.S. Cl. .............. 382/167; 382/162; 382/274; 382/275; 382/100; 358/1.9; 358/500; 358/504; 358/518
(58) Field of Classification Search .......... 382/162, 382/167, 274, 100, 275; 358/1.9, 500, 504, 358/518–523; 345/589, 590, 591–593, 597–601
See application file for complete search history.

(56) References Cited

U.S. PATENT DOCUMENTS

| 5,412,200 | A | 5/1995 | Rhoads |
| 5,448,053 | A | 9/1995 | Rhoads |
| 5,460,178 | A | 10/1995 | Hudon et al. |
| 5,570,108 | A | 10/1996 | McLaughlin et al. |
| 5,642,293 | A | 6/1997 | Manthey et al. |
| 5,650,942 | A | 7/1997 | Granger |
| 5,832,100 | A | 11/1998 | Lawton et al. |
| 5,881,209 | A | 3/1999 | Stokes |
| 5,982,416 | A | 11/1999 | Ishii et al. |
| 5,991,511 | A | 11/1999 | Granger |
| 6,003,065 | A | 12/1999 | Yan et al. |
| 6,008,907 | A | 12/1999 | Vigneau et al. |
| 6,035,065 | A | 3/2000 | Kobayashi et al. |
| 6,037,950 | A | 3/2000 | Meir et al. |
| 6,043,909 | A | 3/2000 | Holub |

(Continued)

FOREIGN PATENT DOCUMENTS

EP    0 781 036 A1   6/1997

(Continued)

*Primary Examiner*—Matthew C. Bella
*Assistant Examiner*—Ali Bayat
(74) *Attorney, Agent, or Firm*—James Trosino

(57) ABSTRACT

Methods and apparatus are provided for automatically correcting colors of a digital image. The methods and apparatus create a first digital image of a target test sheet under a predetermined lighting condition, the target test sheet including a plurality of regions, each region including a known color value, the first digital image including a plurality of regions, each region including an acquired color value, compare the acquired color values to the known color values to align the regions of the target test sheet with the regions of the first digital image and generate a profile to correct a color imbalance between the acquired color values and the known color values, create a second digital image under the predetermined lighting condition, and apply the profile to correct a color balance of the second digital image.

15 Claims, 8 Drawing Sheets

U.S. PATENT DOCUMENTS

| | | |
|---|---|---|
| 6,072,589 A | 6/2000 | Rozzi |
| 6,115,492 A | 9/2000 | Meltzer et al. |
| 6,473,199 B1 * | 10/2002 | Gilman et al. ............... 358/1.9 |
| 6,504,950 B1 * | 1/2003 | Murashita et al. .......... 382/162 |
| 6,594,388 B1 * | 7/2003 | Gindele et al. ............. 382/167 |
| 6,628,826 B1 * | 9/2003 | Gilman et al. .............. 382/167 |
| 6,628,829 B1 * | 9/2003 | Chasen ....................... 382/167 |
| 6,671,067 B1 * | 12/2003 | Adam et al. ................. 358/1.6 |

FOREIGN PATENT DOCUMENTS

| | | |
|---|---|---|
| EP | 0 857 998 A1 | 8/1998 |
| EP | 1 030 513 A2 | 8/2000 |
| GB | 2 308 773 A | 7/1997 |
| WO | WO 92/04803 | 3/1992 |
| WO | WO 92/15957 | 9/1992 |

* cited by examiner

METHOD AND APPARATUS FOR AUTOMATED IMAGE CORRECTION FOR DIGITAL IMAGE ACQUISITION

REFERENCE TO RELATED APPLICATIONS

This application is a continuation of U.S. application Ser. No. 09/826,336, filed 3 Apr. 2001, now U.S. Pat. No. 6,956,966.

BACKGROUND

The invention relates to methods for assuring correct colors in a digital image file as a picture is captured by a camera, scanned, or printed onto a medium at a specified printer location, or simply displayed in the digital space. More particularly, the invention relates to methods for transforming the colors in a digital image to a color corrected digital image.

The traditional method for creating photographic images was based upon the silver halide film process. A camera holds a film that contains silver halide particles which are sensitive to light. When the photographer takes a picture, the image is recorded on the silver halide particles, which are later chemically processed. To make prints, especially enlargements, the photographic image is then transferred via a second photographic process to paper containing a layer of silver halide particles, and the process is repeated. In the case of color photography, the film and the paper use silver halide for each color also but include tinted filters to assure that red light, for example, exposes one layer, blue light another layer, etc.

Different light sources have different balances of energy. As is quite well known in optics, visible light is made up of different wavelengths of energy. Direct sunlight at midday is considered neutral; incandescent light is considered warm, because it has a higher proportion of red light; and fluorescent light is considered cool, because it has a higher proportion of green and blue light.

Although the eye sees these differences in light balance, the brain generally compensates by adjusting the perceived color balance. Achieving a proper color balance in film and paper involves adjusting the filters used on the separate layers of the silver halide crystals. Balancing a specific print is a painstaking, trial and error process.

Traditional still cameras do not affect color balance, except in the trivial sense that lenses may have very slight chromatic effects. The film and paper have color characteristics that significantly affect the color balance of the final print. Most color snapshots today are printed using highly automated electronically controlled printing machines that take these color profiles into account, and require little if any user intervention to get pleasing color output.

However, these automated processes cannot completely compensate for all variables, because a large portion of color variability is attributable to the light source used to illuminate the subject. Different sources of light include varying levels of the components of the spectrum of visible light, which causes them to appear to have different overall color balances. Incandescent light tends to favor yellow; florescent light tends to favor bluish green. While the human brain tends to accommodate quickly to these differences and recalibrate the internal sense of what is a neutral white or gray, a photograph cannot completely compensate one situation into another and the results can be very obvious even to non-professionals.

Color matching in professional photography is often of critical importance. Color matching in professional photography is generally time consuming because colors of various items, such as clothing and other consumer goods, must be precisely reproduced for catalogs, advertisements and brochures. The process could, therefore, get prohibitively expensive in most cases unless a photographer with experience can expedite the processing.

In the last few years, digital photography has begun making significant inroads as an alternative medium for creating and manipulating images. In addition, the availability of inexpensive scanners has made it possible for many people to take photographs created using traditional film processes and manipulate, transmit or print them digitally.

Lately, digital color printing has also evolved significantly, in part, because of color profiles created to map the color characteristics of specific devices. It is, therefore, possible now to get consistent color output on a variety of devices. However, it is considerably more difficult to assure proper color in the creation of a digital file, such as a digital image file provided by a digital camera.

A common problem when one deals with digital color imaging devices is getting the colors on the image as printed or displayed on a monitor to match the true object. For example, a color scanner as an input device is associated with device dependent color space containing colors such as red, green, and blue ("RGB"). The device dependent color space, where colors are described in digital RGB values, determines the color representation of that particular device. This color space is different for each such imaging device and is thus called device dependent color space.

Just as input devices are associated with device dependent color space, output devices, e.g., printers, also operate in device-dependent color space. Colors printed on any given printer typically do not match colors printed on a different printer because each printer is associated with a cyan, magenta, yellow, and black ("CMYK") device dependent color space. Each image-rendering device, such as a printer or a monitor, has a limited range of colors that it can reproduce, known as a gamut.

Under different lighting conditions, devices such as digital cameras may also have difficulty accurately capturing the full range of values of brightness or contrast. If the image does not accurately distinguish between darker values, then shadow detail is lost and pictures may appear muddy. If the image does not accurately distinguish between light areas, highlights appear without detail and the image may look washed out. By using a test image with a range of values of the same color, such as a grey scale, it is possible to adjust the range of contrast to achieve a more pleasing and natural color balance.

It would be advantageous to provide digital color correction methods to correct for the differences between the reference colors in a color chart and those same colors as presented in an image that is recorded by a photographic device or a film medium.

It would also be advantageous to provide automated color correction methods to correct for the differences between the reference colors in a color chart and those same colors as presented in an image that is recorded by a photographic device or a film medium, and to adjust for optimum contrast and brightness.

SUMMARY

The invention provides color corrected digital profiling methods that can correct for differences between reference colors according to a color chart and the reference colors as recorded and submitted as an image recorded by a photographic device or a film medium. In an exemplary embodiment, this process is automated so that the time spent by a user of photo imaging devices is minimized and so that special expertise is not required to achieve excellent color fidelity and contrast. In another exemplary embodiment, this automated process is encoded in software or hardware included within the camera or other image acquisition device.

An exemplary method in accordance with the invention comprises acquiring a digital image file of the test image or target containing color samples of known values at known positions within the target using a digital image acquisition device such as a digital camera, scanner, or other suitable device. The method further involves comparing the digital color values of the test image with the known values to determine whether the test image is properly aligned and oriented. The method further involves comparing the known values of the colors in the test image with the actual values obtained by the device under the specific conditions in which it is being used. The method further involves generating a corrective color profile that adjusts the hue, contrast, and overall exposure of the image to match the reference values as closely as possible. In an exemplary embodiment, this process takes place entirely within software and/or hardware contained within the image acquisition device. In another embodiment, the method involves use of software loaded on a computer such as a PC. In a third embodiment, the method involves registering over a network such as the Internet to obtain access to profiling software. The registration itself involves using a password or access code for using the software on the computer.

In an exemplary embodiment, the test image is submitted to a server upon which the color correction software is stored. The profiling software itself checks the image file generated from the scanner or the digital camera and compares the values obtained with the known reference values of the colors on the target test sheet under specific lighting conditions. The profiling software specifically checks the submitted object file for orientation, alignment, color intensity, and hue with respect to the image of the target test sheet.

In various exemplary embodiments, an image transformation algorithm is created to match colors of the submitted image file with colors of the target test sheet and thereby creates a color corrected image profile for the submitted image file. The image transformation algorithm matches the colors of the submitted image file with colors of the target test sheet using a binary color coding in which a unique binary number represents each color. Where the color correction process is contained within the image acquisition device, the image transformation algorithm is used to correct subsequent images taken under the same lighting conditions. Where the color correction process is in software in a local computer or on a network, the user can apply the corrective profile to other images selected by the user. The generated color corrected image can be manipulated, transmitted to a local or a remote printer, transmitted to a digital exhibit space, or simply compared to the submitted digital image. The generated color corrected image profile is typically transmitted in digital space via e-mail. The color corrected image profile can be saved for future use or uploaded to a Web site wherein several image files can be color corrected in sequence or in random order.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

The invention provides a solution to the problem of color matching of digital images using a color matching technique involving a color chart for profiling, and profiling software that generates an image profile after correcting for the differences between the color chart of known hue, saturation, and intensity with a recorded image from, for example, a digital camera. The generated profile can be stored and viewed in an exhibit space or used for processing multiple images of color corrected digital files.

Figure 1:
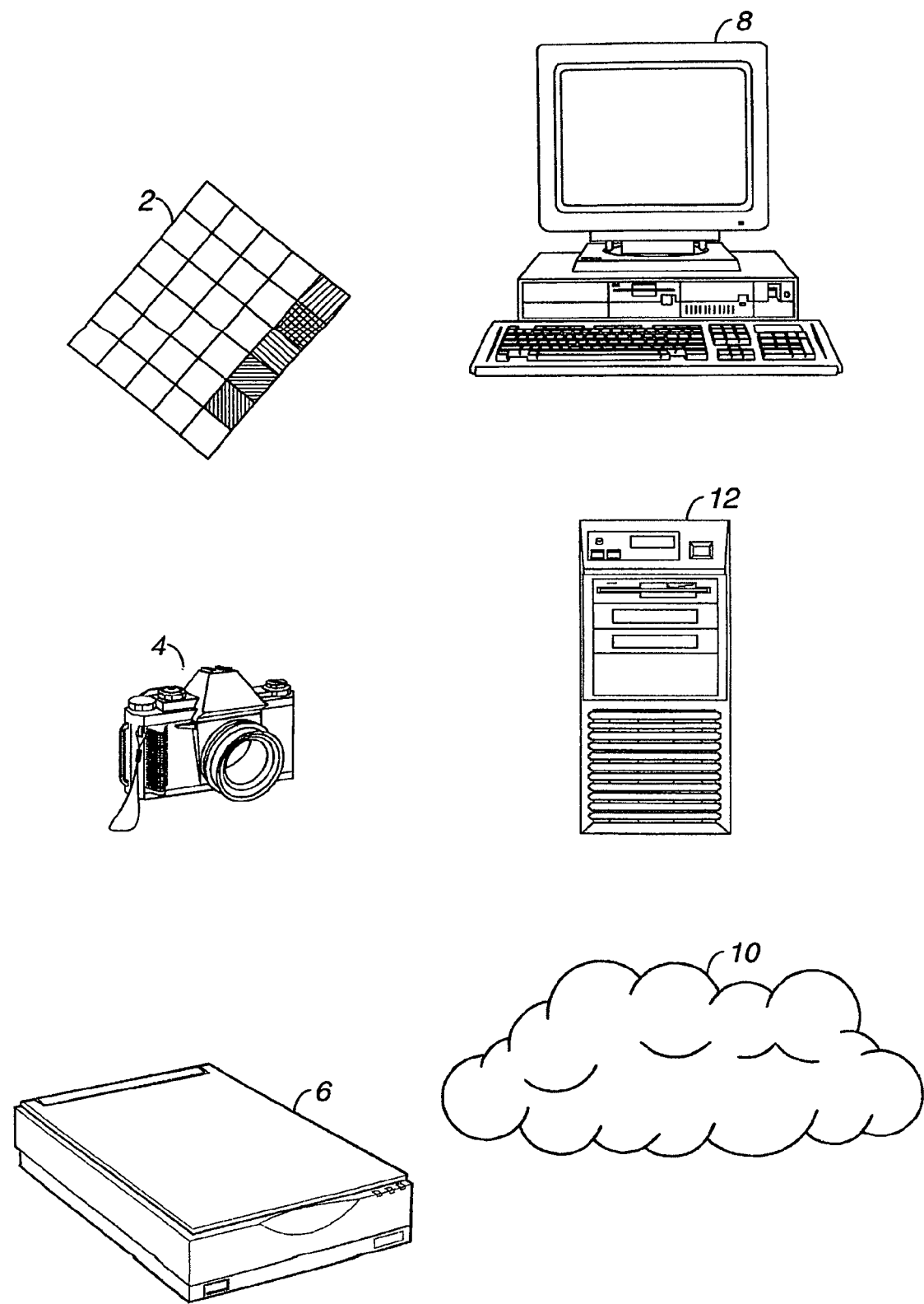
FIG. 1 illustrates components of an exemplary color matching technique according to the invention.

To use the herein described color matching technique (FIG. 1), the user is provided with a target test sheet 2 and an imaging device, such as a digital camera 4 or a color scanner 6. To generate a color profile for a digital camera 4, the user takes a photograph of the target test sheet 2 under the specific lighting conditions for which the profile is desired. In the case of a scanner 6, the user scans the target test sheet 2.

The following steps are same for both the scanner 6 and the digital camera 4. The user then downloads the file containing an image of the target to a client computer 8. The user then transmits the file over a network such as the Internet 10 to a server 12. The server 12 then opens the file.

Figure 2:
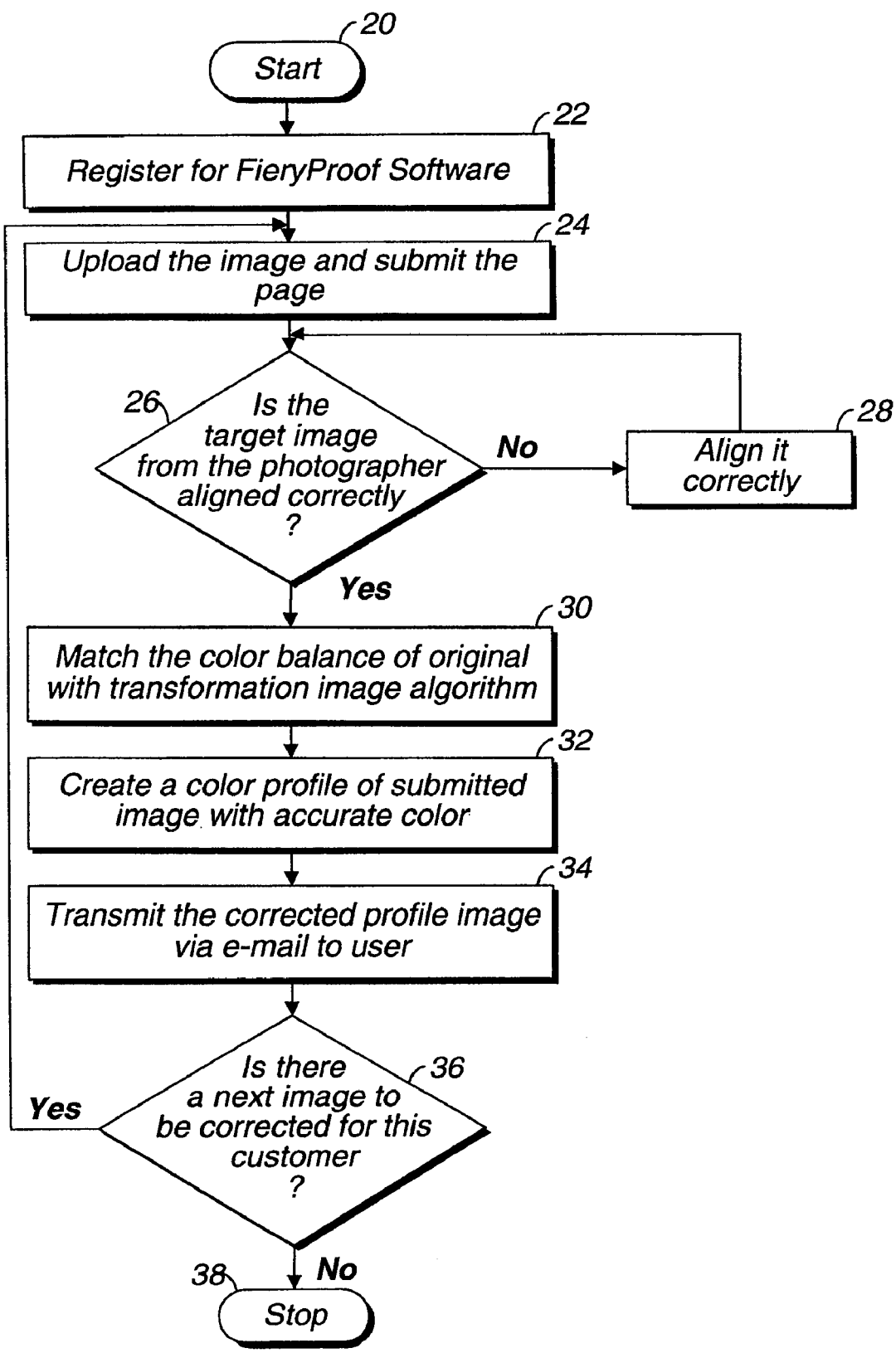
FIG. 2 is a flow diagram of exemplary steps for forming a color corrected digital image file according to the invention.

FIG. 2 is a flow diagram showing the steps involved in profiling software for forming color corrected digital image files. To use the profiling software in one embodiment of the invention, one must be registered and logged in to a web site. Once the user is registered 22 and logged in, the user can access software that allows the user to apply the transformation algorithms available at the web site. Ideally, the user is able to accomplish these transformations through a one-click process. After downloading the application, the user uploads a file 24, which the web site logs with the user's unique identifier.

The web site then runs a program that uses a pattern recognition algorithm or algorithms 26 to assure that the image of the target captured by a photographer is aligned 28 correctly so that, for example, the cyan target in the transmitted image is corrected to equal the original cyan target, rather than the blue or green, which would result in a major distortion of the color balance. There are two general approaches that could be taken to accomplish this. One approach is that, prior to submission of the image containing the target, the user software could prompt the user to identify via mouse clicks the location of the corners or other identifying locations in the target that the software could use as a reference to align the image of the target and accurately compare the values of each color sample in the submitted image with the correct color image sample.

A more automated system operates without requiring the user to take this step. In the case of a color correction system contained within the image acquisition device itself, the device, such as a camera, accomplishes this result without requiring the user to participate other than to inform the camera through an input, such as selection of a menu item or pressing of a button or other input device. The color correction software then samples the image, searching, for example for the 100% cyan region in the test image by determining whether there is a region in the image that is roughly the appropriate shape and with color values relatively close to cyan. The software samples a large number of regions to find a region that meets the selection criteria. Once the software identifies a region that appears to satisfy the selection criteria, the software searches the areas immediately adjacent to the identified region for a color sample known to be adjacent to the that color sample in the test image. If the software does not locate the required color sample candidate, it rejects the original sample and starts the process again. If the software does locate the expected second color sample, it repeats the process in searching for a third known sample, and so on through sufficient iterations to achieve a sufficiently high level of confidence that the target has been properly located and oriented. Such image recognition and pattern recognition software are known in the art.

The software then executes a transformation algorithm that compares the numerical value of specific color samples in the image captured by the user to the known values in the original target, and generates a numerical difference value. For example, in the CMYK space, the proper value for a cyan area in the target image might be (255, 0, 0, 0), where the first value represents the level of cyan on a scale of 0 to 255, the second the level of magenta, the third of yellow, and the last of black. If for example, the software determined that the value for the area as captured by the acquisition device was (250, 10, 2, 5), the program would compare the submitted values to the known values and generate a transformation profile of (+5, −10, −2, −5) to correct the color imbalance and thus match the color balance of the original image 30 as closely as possible. The program then creates a profile, which consists of the settings or adjustments needed by the software to convert an image with the color balance 32 in the submitted image to one having accurate color.

In the case of software or hardware included within the image acquisition device, the device then uses the profile for subsequent images. The image acquisition device uses the new profile until the user inputs his desire to stop using it. Alternatively, the device could use additional software to sense that the lighting conditions have changed, discontinue use of the profile, and prompt the user to repeat the profiling process. In the case of image correction on a local computer or over a network, a file containing the profile is created and optionally saved.

In the case of software on a local computer, the user can then apply the profile to one or more images. In the case of software operating over a network, the server then transmits the profile, either via email or by allowing the user to otherwise download the profile 34. In the network embodiment of the invention, the server 12 (FIG. 1) sends the profile back to client computer 8 over a network 10. The user can then use the software to load the profile onto client computer 8 and apply the profile to other image files, thus correcting color balance of those images. Ideally, this function is as simple as the user using a mouse or other cursor controller to drag the profile icons onto an image file, or vice versa. The user then has the option to accept or reject the corrected image and save the corrected file 14. This procedure can be repeated several times, for example at a customer's request, until terminated.

A photographer wishing to use the herein disclosed color matching technique first obtains a target test sheet 2 (FIG. 1), which may be a printed cardboard, plastic, paper, or other test sheet containing a color target (a test pattern of color samples), as well as basic instructions for use 50. He then uses his digital camera 4 to photograph the test sheet in the exact lighting conditions he wishes to control. Typically, this is accomplished by taking a test shot immediately before 54 the picture he desires to calibrate. In the case of software embedded in a digital camera, the user simply signals the camera to adjust exposure, and all subsequent photographs are automatically adjusted for the current lighting conditions.

In the case of software available over the network, the photographer then registers with the server or website 60. The server or web site gives the user a unique account. The photographer then uploads the test photograph to the server or web site 62. The user receives an executable file in the form of an email attachment or other file from the server or web site.

Figures 1, 3A:
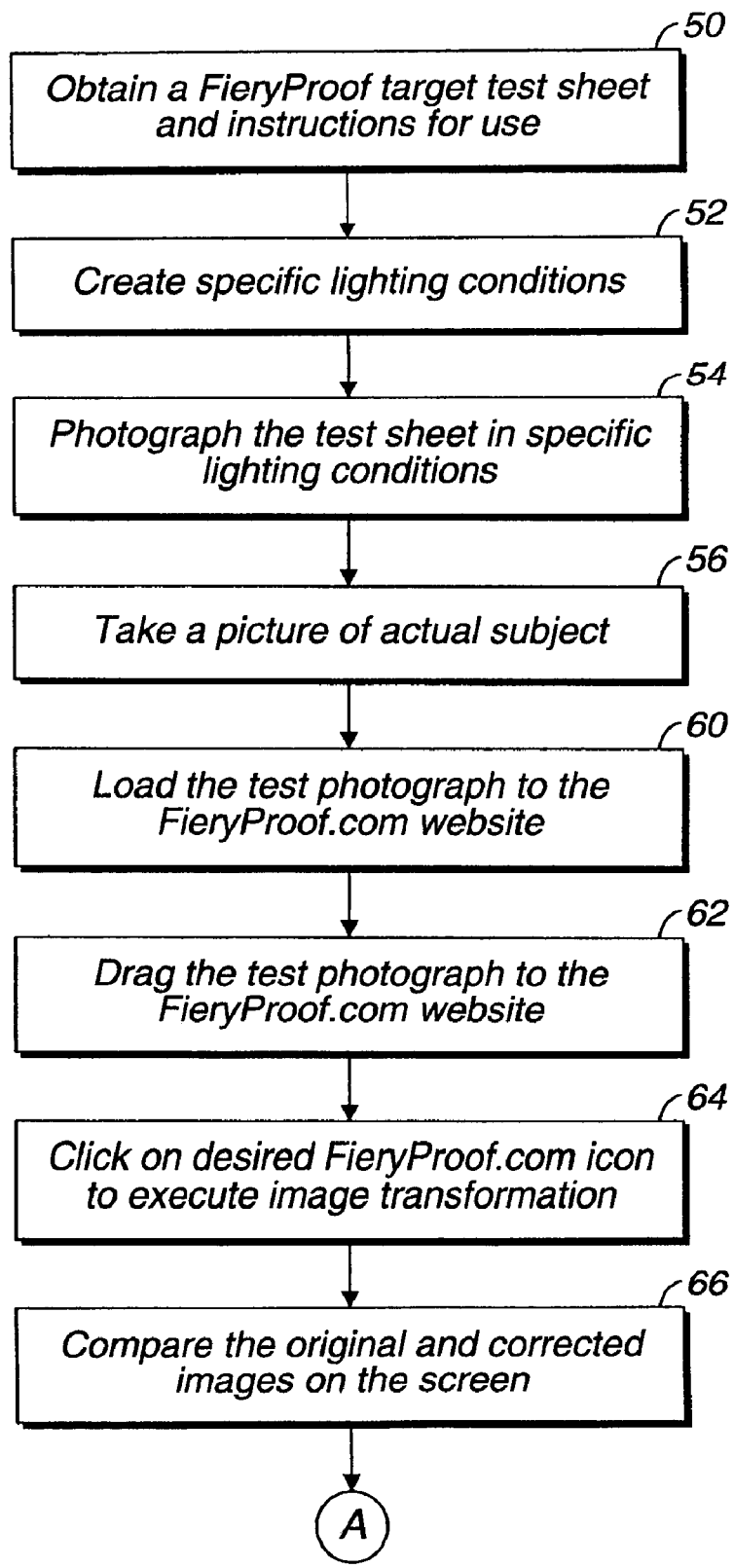
FIG. 3A is a flow diagram of exemplary steps for obtaining digital color images using a color matching technique on a local printing machine according to the invention.
Figures 2, 3A:
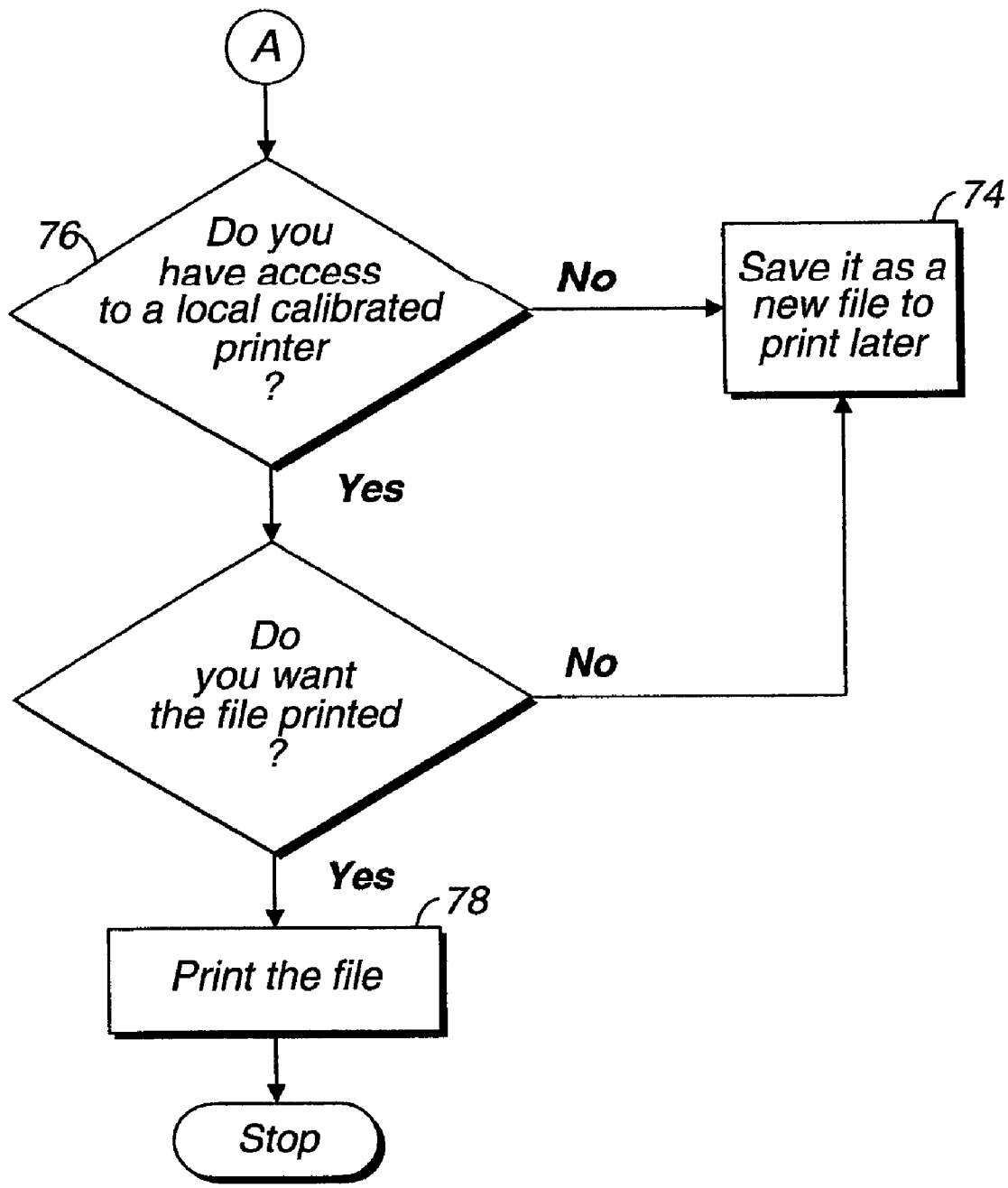
Figure 3B:
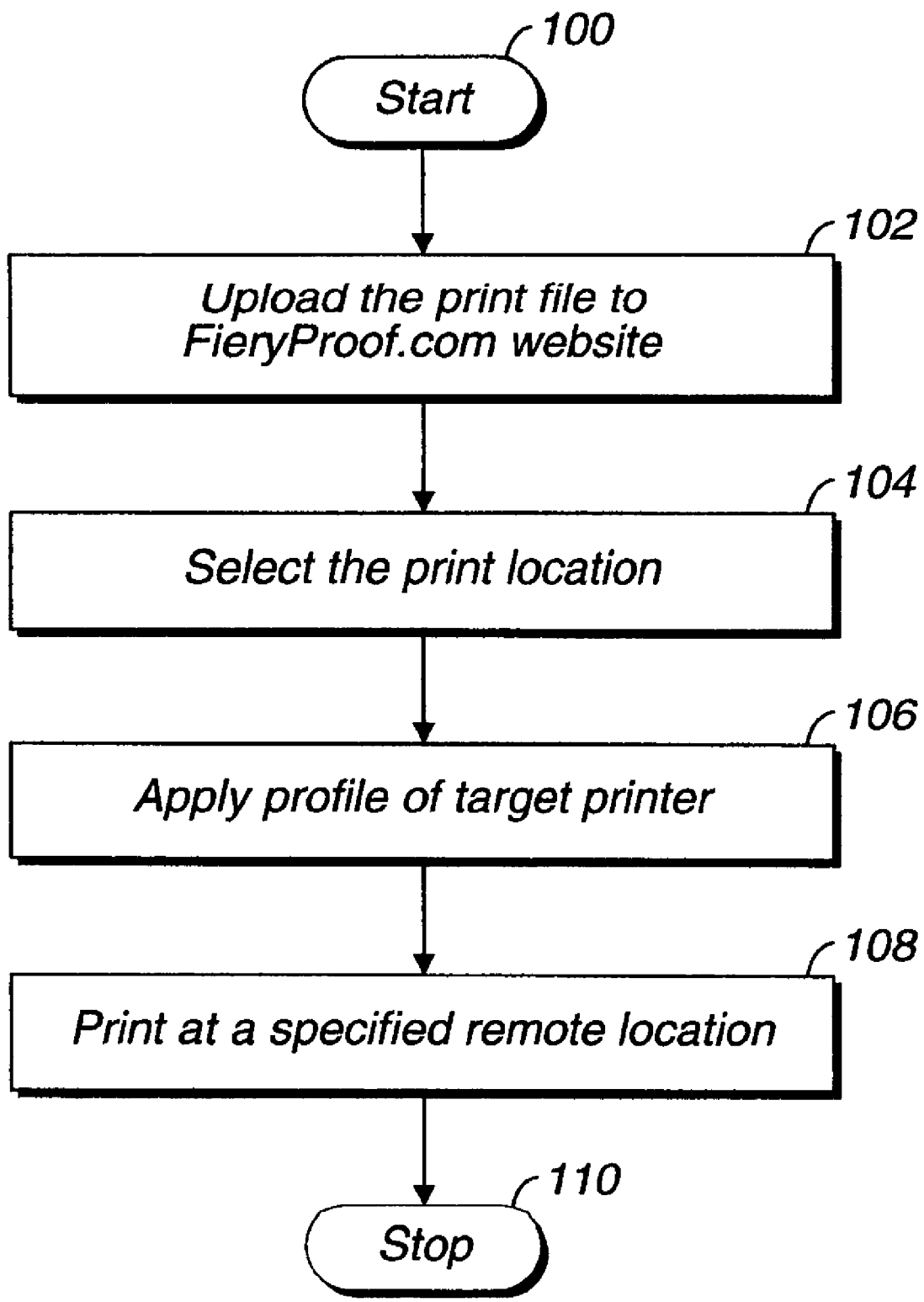
FIG. 3B is a flow diagram of exemplary steps for obtaining digital color images using a color matching technique on a remote printing machine according to the invention.

By clicking on the executable file, the user can then create a profile on his computer that allows him to process images taken with that camera and correct for the lighting conditions. For example, the user could open the image using software such as Adobe Photoshop or a web browser. Clicking on the desired icon automatically starts a software process that executes 64 the image transformation and allows the user to compare 66 the original and corrected images side-by-side on the screen. The user can then choose 68 to accept or reject the corrected image and save it in a new file 74. If the user has local access to a calibrated printer 76, he can then print 78 the images using the profile. If the user wishes to print remotely (FIG. 3B), he can upload the profiled print 102 to the server or web site in encrypted form and then specify a remote location to print 104 the file as corrected by the algorithm herein. At the time the file is processed for printing, this step is followed by the step of applying a profiling of the target printer 106 and terminating the session 110 as soon as the printing is done 108. Printing may occur immediately after the file is sent to the remote location, or may be delayed, for example, until the user arrives at the remote printing location.

Figures 1, 4A:
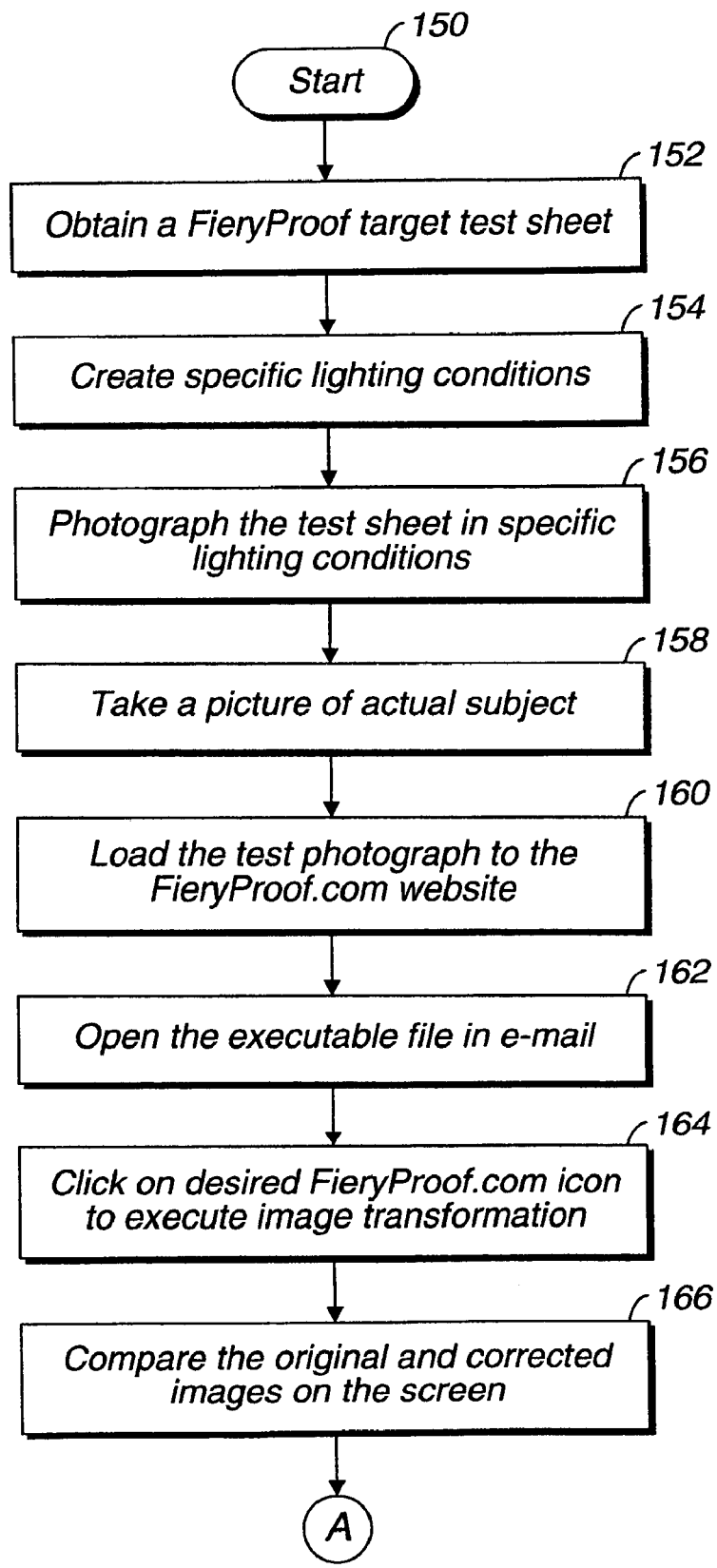
FIG. 4A is a flow diagram of exemplary steps for uploading images onto a digital exhibit space using a color matching technique according to the invention.
Figures 2, 4A:
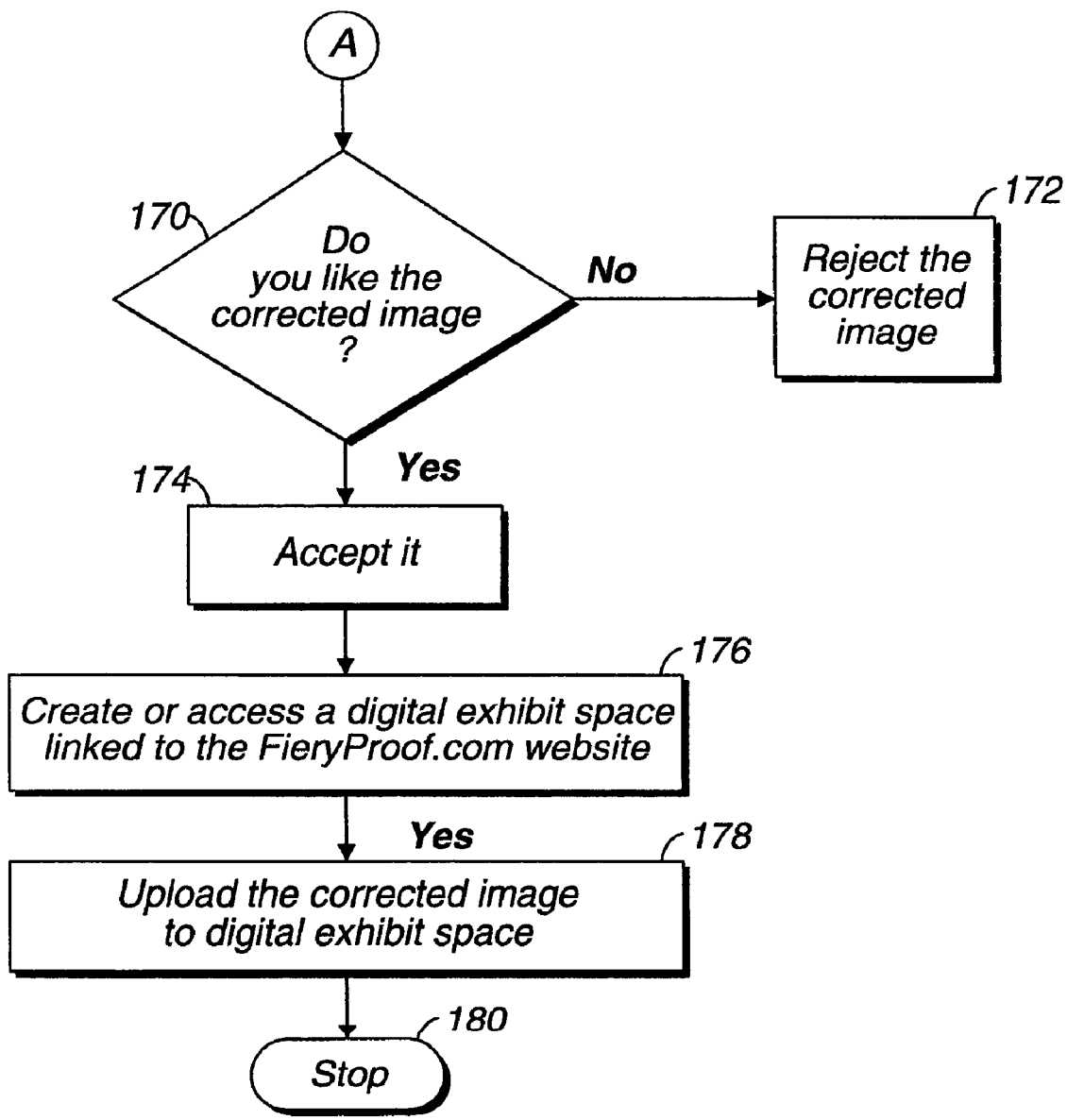
Figure 4B:
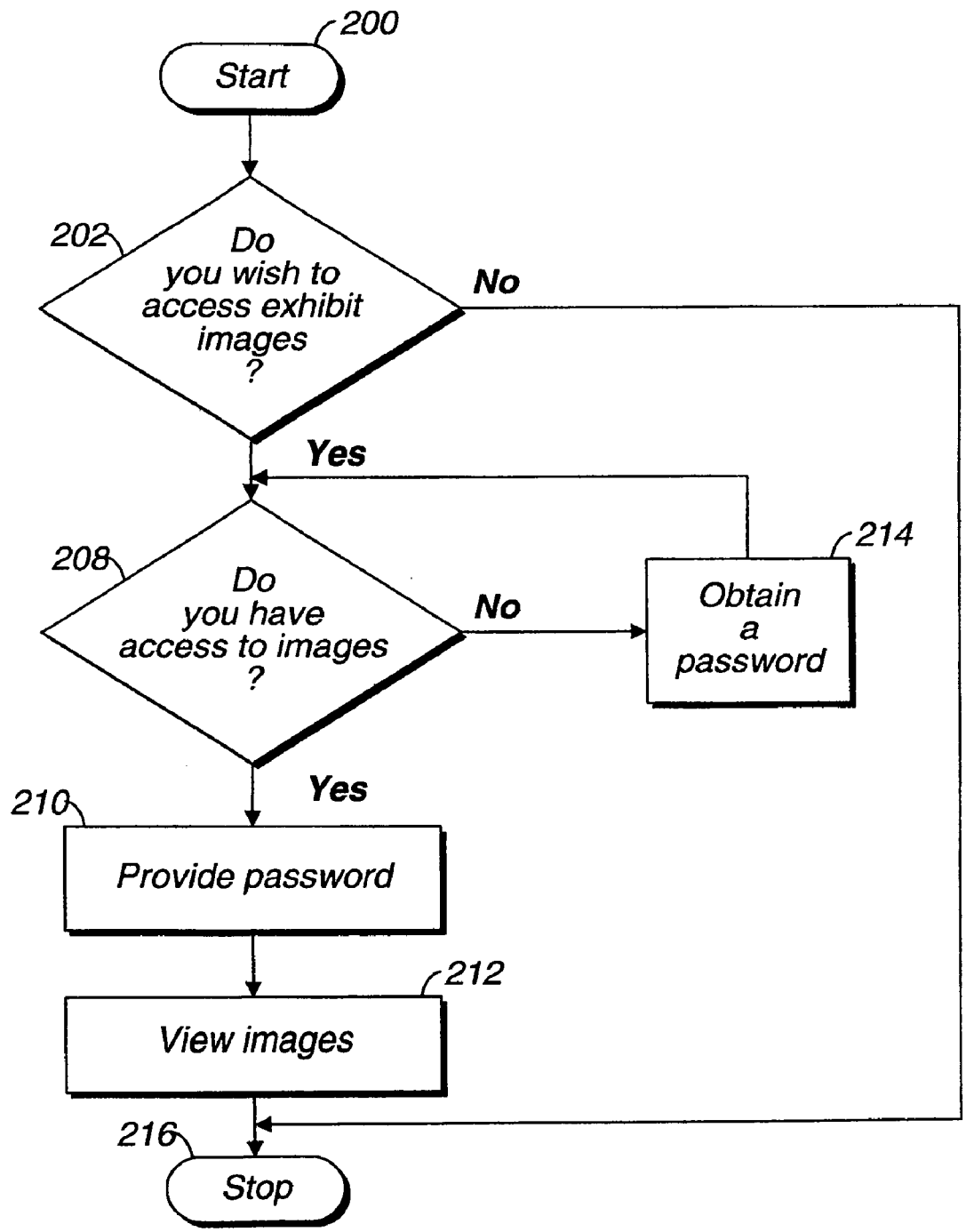
FIG. 4B is a flow diagram of exemplary steps for obtaining access to color images on a digital exhibit space using a color matching technique according to the invention.

Alternately, the user can upload the corrected image to a digital exhibit space linked to the server or web site (FIGS. 4A and 4B). The user has the option to set permission and/or passwords to control the access to the digital images. FIG. 4A is a flow diagram that shows the steps involved in uploading digital images onto a digital space using the herein disclosed color matching technique.

The user starts the uploading process 150 by obtaining a target test sheet 152 and photographs the test sheet 156 in specific lighting conditions. Such lighting conditions could include, for example, incandescent lighting, fluorescent lighting, daylight, or any combination thereof. The user then captures the image for which correction is desired under the same lighting conditions 158.

In the case of a camera containing the color correction software, the user then instructs the camera to optimize the image. Alternatively, the camera could apply the transformation as a filter prior to capturing the image, to maximize the physical capabilities of the device.

In the case of software accessible from a network, the user then loads 160 the test photograph to the server or web site. The profiling software color matches the values for the color target as captured in the picture to the known values for those colors in the target test sheet from step 156. An executable file or, alternatively a profile to be used by profiling software for subsequent processing is created by the profile generating software and transmitted to the user via e-mail or other electronic means. The user can check one or more of his pictures for color matching by clicking or dragging the image onto the image transformation icon or, alternatively, by dragging the icon onto the image. The user can compare the original picture image with the color corrected image on the screen 166 and check 170 to accept 174 or reject 172 the corrected image file. If the user likes the color corrected image file, he may choose to create and access 176 a digital exhibit space, wherein the mentioned digital exhibit space is linked to the web site. The color corrected image file could also be uploaded 178 to digital exhibit space for viewing instead of printing. The user can then logoff to stop the viewing 180. A copy of the color corrected image file remains in the digital space created for the user for use at a later time.

To log on to the digital exhibit space to obtain access to digital color images (FIG. 4B) at some later time, the user starts the process 200 by accepting an offer to log on to the digital image space 202. It is determined then 208 if the user has a password, in which case he provides one 210, or needs to obtain one 214. As soon as a password is provided, the user can view the images he created in digital image space 212 and log off when finished to stop 216 the process.

The presently preferred embodiment of the invention, therefore, provides a method of correcting colors in a digital image taken from an image generating device and a software that makes the color corrected images available as either a downloadable image file or simply a file for viewing in the digital space. It is expected to benefit a novice photographer to a more experienced photographer in terms of time, cost and quality of color print that is made.

Although the invention has been described in detail with reference to particular preferred embodiments, persons possessing ordinary skill in the art to which this invention pertains will appreciate that various modifications and enhancements may be made without departing from the spirit and scope of the claims that follow. For example, a standard film cameras may incorporate software that identifies when a target is being imaged and use the camera's exposure control sensors to capture ambient lighting information. Such information is compared with profile information stored within the camera and a correction value can be printed to the film for use by a processing laboratory. Further, while a software implementation of the invention is described herein, it will be appreciated by those skilled in the art that the invention, or portions thereof, may comprise a mechanism that is implemented in hardware level logic.

The invention claimed is:

1. A digital image processing method comprising:
creating a first digital image of a target test sheet under a predetermined lighting condition, the target test sheet comprising a plurality of regions, each region comprising a known color value, the first digital image comprising a plurality of regions, each region comprising an acquired color value;
comparing the acquired color values to the known color values to align the regions of the target test sheet with the regions of the first digital image and generate a profile to correct a color imbalance between the acquired color values and the known color values;
creating a second digital image under the predetermined lighting condition; and
applying the profile to correct a color balance of the second digital image.

2. The method of claim 1, further comprising comparing an intensity of the acquired color values with an intensity of the known color values.

3. The method of claim 1, further comprising comparing a hue of the acquired color values with a hue of the known color values.

4. The method of claim 1, wherein each color value is represented by a unique binary number.

5. The method of claim 1, further comprising saving the profile for future viewing.

6. The method of claim 1, further comprising linking the profile to a digital exhibit space.

7. The method of claim 6, further comprising accessing the digital exhibit space using access codes.

8. The method of claim 6, further comprising accessing the digital exhibit space using a password.

9. A digital image acquisition device comprising computer software structured to cause the image acquisition device to:
create a first digital image of a target test sheet under a predetermined lighting condition, the target test sheet comprising a plurality of regions, each region comprising a known color value, the first digital image comprising a plurality of regions, each region comprising an acquired color value;
compare the acquired color values to the known color values to align the regions of the target test sheet with the regions of the first digital image and generate a profile to correct a color imbalance between the acquired color values and the known color values;
create a second digital image under the predetermined lighting condition; and
apply the profile to correct a color balance of the second digital image.

10. The digital image acquisition device of claim 9, wherein the digital image acquisition device comprises a camera.

11. The digital image acquisition device of claim 9, wherein the digital image acquisition device comprises a scanner.

12. The digital image acquisition device of claim 9, wherein the computer software is further structured to cause the digital image acquisition device to compare a hue of the acquired color values with a hue of the known color values.

13. The digital image acquisition device of claim 9, wherein each color value is represented by a unique binary number.

14. The digital image acquisition device of claim 9, wherein the computer software is further structured to cause the digital image acquisition device to save the profile for future viewing.

15. The digital image acquisition device of claim 9, wherein the computer software is further structured to cause the digital image acquisition device to link the profile to a digital exhibit space.

* * * * *